United States Patent
McCarthy et al.

(10) Patent No.: US 12,233,718 B2
(45) Date of Patent: Feb. 25, 2025

(54) TACTILE ENERGY GENERATION BASED ON AUDIO SIGNAL

(71) Applicant: Ford Global Technologies, LLC, Dearborn, MI (US)

(72) Inventors: Mark McCarthy, Ann Arbor, MI (US); John Marshall Dodson, II, Ann Arbor, MI (US); Alexander Petniunas, Canton, MI (US); Alan Robert Dona, Huntington Woods, MI (US); Jason Konopa, Clawson, MI (US); Brian Schabel, Northville, MI (US); Mark Lynn Clapper, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 17/938,859

(22) Filed: Oct. 7, 2022

(65) Prior Publication Data
US 2024/0116369 A1  Apr. 11, 2024

(51) Int. Cl.
*B60L 15/20* (2006.01)
*G06F 3/16* (2006.01)
*H02P 23/00* (2016.01)

(52) U.S. Cl.
CPC ............. *B60L 15/20* (2013.01); *G06F 3/165* (2013.01); *H02P 23/0004* (2013.01); *B60L 2240/423* (2013.01)

(58) Field of Classification Search
CPC .... B60L 15/20; B60L 2240/423; G06F 3/165; H02P 23/0004
See application file for complete search history.

(56) References Cited

U.S. PATENT DOCUMENTS

| | | | |
|---|---|---|---|
| 6,947,893 B1 * | 9/2005 | Iwaki | G10L 19/018 704/E19.009 |
| 8,472,638 B2 | 6/2013 | Furge et al. | |
| 10,766,499 B2 | 9/2020 | Mergl et al. | |
| 11,163,365 B2 * | 11/2021 | Helmer | G06F 3/016 |
| 11,192,420 B2 | 12/2021 | Anderson et al. | |
| 2010/0097239 A1 * | 4/2010 | Campbell | H04M 1/6083 455/466 |
| 2018/0339652 A1 * | 11/2018 | Prescott | B60Q 5/005 |
| 2021/0035586 A1 * | 2/2021 | Cech | G06T 7/254 |
| 2022/0094253 A1 | 3/2022 | Houston et al. | |
| 2023/0308802 A1 * | 9/2023 | Balan | H04R 3/04 |

FOREIGN PATENT DOCUMENTS

| | | |
|---|---|---|
| DE | 19746523 A1 | 5/1998 |
| WO | 2021102291 A1 | 5/2021 |

* cited by examiner

*Primary Examiner* — Gertrude Arthur Jeanglaude
(74) *Attorney, Agent, or Firm* — David Kelley; McCoy Russell LLP

(57) ABSTRACT

Methods and systems are provided for generation of lower-frequency tactile energy (e.g., vibration) of a vehicle system based on audio signals. In one example, a method may include acquiring an audio signal from an audio system, generating a motor input command, and applying the motor input command to at least a first traction motor and a second traction motor to create a resultant vibrational force.

17 Claims, 8 Drawing Sheets

TACTILE ENERGY GENERATION BASED ON AUDIO SIGNAL

FIELD

The present description relates generally to methods and systems for controlling traction motors of an electric vehicle to generate tactile energy in a vehicle system in coordination with audio from an audio system of the vehicle.

BACKGROUND/SUMMARY

Recent customer research has revealed that customers spend a significant amount of time in 'stationary moments' where the vehicle is occupied but not moving. Customers leverage these moments for work, rest, and play. One example element provides customers with enhanced entertainment options that has the potential to make the vehicle the preferred seating location, for example, relative to a home space. While modern automotive audio systems may provide a robust acoustic environment, available vibrational response provided by subwoofers of an automotive audio system may be less than is desired to enhance an overall experience. By comparison, movie theaters and video gaming systems may use mass-based shakers to provide lower-frequency tactile energy. However, these systems may have packaging space and resource demands which make them inefficient to implement in a vehicle.

Other attempts to address vehicle motion (e.g., vibration) as a function of an audio system of the vehicle include inducing vibration of localized parts of the vehicle and inducing vibration using vehicle suspension systems. One example approach is shown by Mergl et al. in U.S. Pat. No. 10,766,499. Therein, systems and methods for controlling vibration units and use of vibration units of a vehicle system are described. The vehicle system includes a vehicle seat system having at least one vibration unit which is configured and disposed to generate vibrations perceptible for a passenger of a motor vehicle, based on real current drive parameters of the motor vehicle. The vibration unit preferably has an electric rotational motor and the vibration unit may be seat-integrated to generate local vibrations in the seat, e.g., the seat as a whole is not moved. Further, in some embodiments, real drive parameters are directly converted into a control signal suitable for controlling the vibration units, which in this case may also be at the same time as the control signal.

Another example approach is shown by Anderson et al. in U.S. Pat. No. 11,192,420. Therein, a method of operating a vehicle with an active suspension system is described, wherein the method includes playing at least one of video and audio within the vehicle, and operating at least one actuator of the active suspension system to induce motion in at least a portion of the vehicle, wherein at least one aspect of the induced motion is synchronized with at least one aspect of the video and/or audio. For example, the active suspension system of the vehicle may perform as a subwoofer of a music system. An audio source may produce an electronic audio signal that is received by a filter, which acts as a low pass filter and provides low frequency content of the audio signal to the active suspension system. In some embodiments, the active suspension system produces low frequency vibration in the vehicle body in response to this filtered audio signal by using one or more suspension system actuators. Examples of such actuators may include electro-hydraulic, electromagnetic and electro-mechanical actuators.

However, the inventors herein have recognized potential issues with such systems. As one example, the system described by Anderson et al. is directed to using an active suspension system of a vehicle to produce low frequency vibration, however it may be desirable to use a different system to produce low frequency vibration when the vehicle is lacking an active suspension system or lacking a robust active suspension system capable of producing low frequency vibration. The system described by Mergl et al. is directed to generating localized vibrations in a vehicle seat based on driving conditions. It may be desirable to generate full-vehicle vibrations when the vehicle is stationary based on audio sources internal to the vehicle (e.g., a video/videogame/music source as opposed to driving condition sensors). For example, full-vehicle vibration may include vibration of a cab, a suspension system, a body, and a frame of a vehicle system, as opposed to regions of the cab and/or vehicle, such as a passenger position.

In one example, the issues described above may be addressed by a method for an electric vehicle traction motor, including driving an input of the traction motor with audio signals in the vehicle to provide supplemental low frequency motion. In this way, vibration (e.g., lower-frequency tactile energy) of the vehicle system may be generated synchronously with audio signal output from an audio system, which may enhance a user experience, using existing drivetrain and vehicle elements.

As one example, the method uses existing battery electric vehicle (BEV) traction motor hardware, such as traction motors used to propel the vehicle. A BEV traction motor may have a fact reaction time to torque, even at zero speed. Thus, an expected reaction time of a vibration system (e.g., to produce lower-frequency tactile energy) may be fast. Potential lag between a motor input command and a vibrational output by the traction motor may occur as motor mounts and suspension bushings react to torque. However, the expectation is that the vibrational output is coordinated with the audio source (e.g., tactile energy in real time). The resultant vibrational force may shake the vehicle system, as opposed to a single or multiple seats. In this way, all passengers of the vehicle may experience the tactile energy. Additionally, a realism of the entertainment experience (e.g., audio, video, video game, and so on) may be enhanced above that of a traditional movie theater and/or gaming chair shaker-based systems by movement of a vehicle system. Using existing hardware of a battery electric vehicle (BEV) to provide lower-frequency tactile energy (e.g., vibration) to the vehicle system may enhance an entertainment experience (e.g., video, audio, video game, and so on) during 'stationary moments' without increasing a complexity, a packaging space (e.g., mass), and/or a cost of the automotive audio system. The tactile energy experience applied to the vehicle system may be coordinated with video, music, video games, other audio sources, and so on to provide a vibrational response for the vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for generating lower-frequency tactile energy, such as vibration, of a vehicle system using traction motors of the vehicle, where vibration of the vehicle is based on and synchronous with audio signal from an audio system of the vehicle. The method may be implemented in an electric vehicle configured with one or more traction motors (e.g., a battery electric vehicle), such as an embodiment of an electrical drive train of a vehicle, shown in FIG. 1. The audio system of a vehicle may include a plurality of speakers disposed in a cabin of the vehicle, as shown in FIG. 2, and user interfaces which may be used to adjust audio devices of the audio system for which vibration is generated. The method for generating vibration may be implemented by a control system of the vehicle, as described with respect to FIG. 3. As described with respect to FIGS. 4 and 6, a method for generating vibration based on audio signal includes generating a motor input command based on an audio signal of the audio system. The motor input command may be provided to the control system and direct applications of torque to the traction motors of the vehicle, as described with respect to FIG. 7. Different torque distributions may be applied to each of at least two traction motors of the vehicle, depending on the vehicle drivetrain and/or user input, as described with respect to FIGS. 5A and 5B. In this way, tactile energy, herein described as vibration, may be generated for the vehicle system based on an audio signal of an audio system of a vehicle, and the vibration may occur synchronously with the audio signal being output through speakers of the audio system (e.g., into the cabin of the vehicle). A user experience may be enhanced by implementing motion of the vehicle which corresponds with audio signal.

Figure 1:
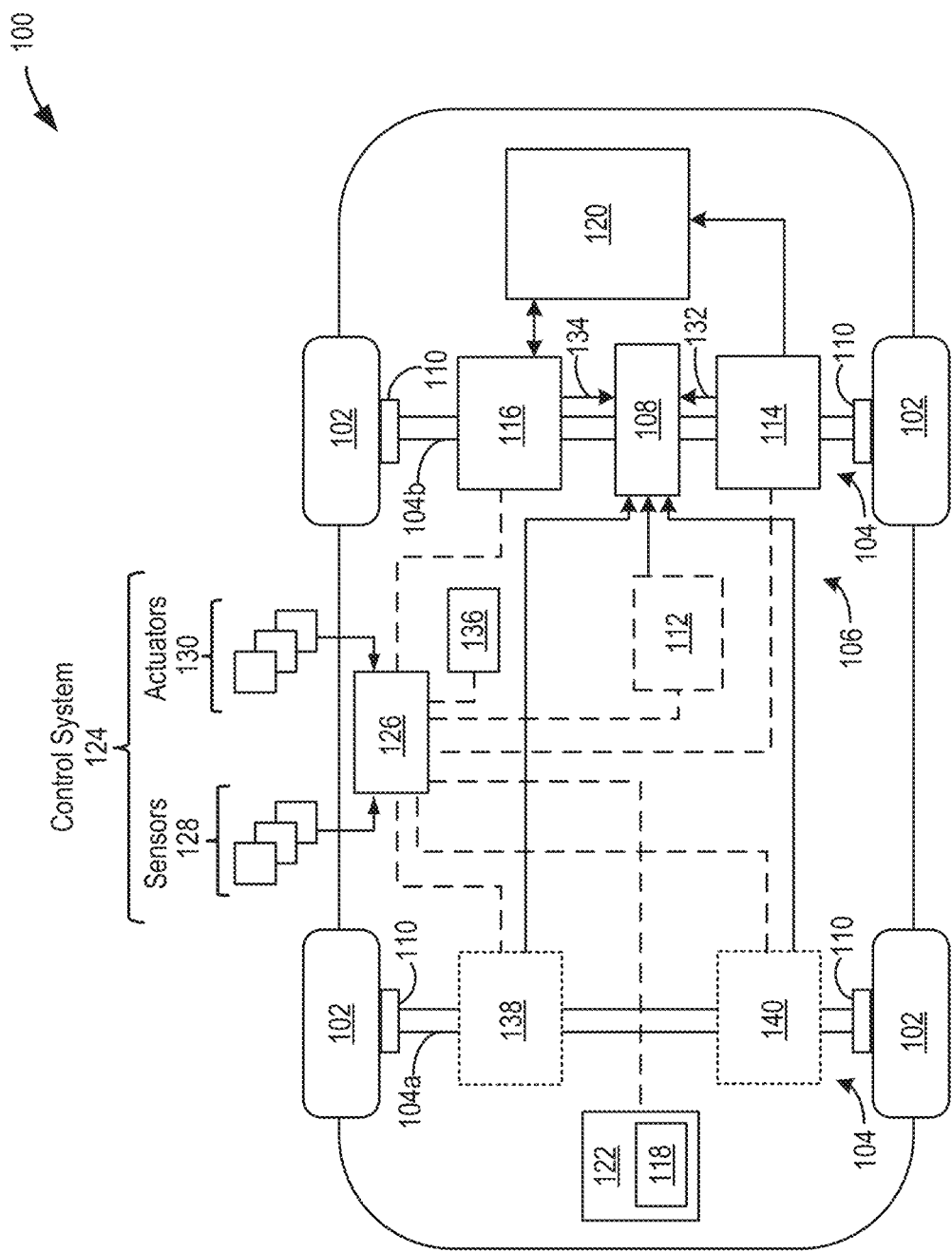
FIG. 1 shows a schematic diagram of an electrical drive train (e-drive) of a vehicle.
Figure 2:
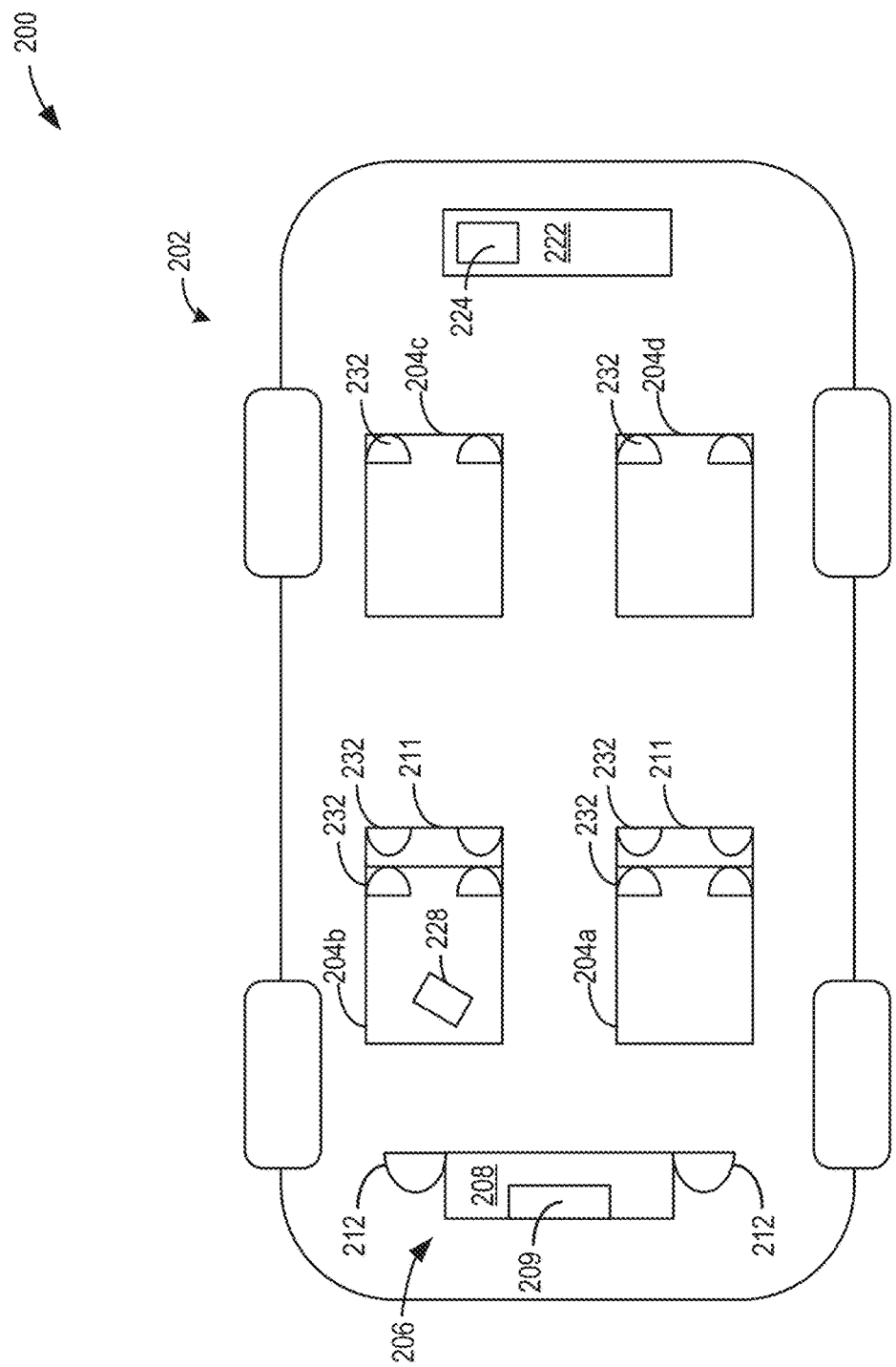
FIG. 2 shows a schematic representation of an embodiment of an interior cabin of a vehicle, such as the vehicle of FIG. 1.

Turning now to FIG. 1, for an electric vehicle (EV), torque may be provided to a vehicle's wheels from more than one source, including one or more electric motors. A schematic representation of a vehicle 100 is depicted in FIG. 1 which includes a set of wheels 102 coupled by axles 104 (e.g., pairs of wheels are coupled to one another by the axles 104). It will be appreciated that vehicle 100 is shown in FIG. 1 for illustrative purposes and is a non-limiting example of how an EV may be configured. Other examples include various arrangements and positioning of components of the vehicle described below as well as additional components not shown in FIG. 1 for brevity. The vehicle 100 and components thereof as described with respect to FIGS. 2-3 may be considered a "vehicle system", wherein generation of lower-frequency tactile energy, motion, and/or vibration of the vehicle system may be interpreted as being applied to the vehicle 100. For example, the vehicle system may include a sprung mass of the vehicle, including any component which are supported by suspension (e.g., the frame, cab, etc.) of the vehicle. Systems and methods for generation of lower-frequency tactile energy, motion, and/or vibration of the vehicle system are described with respect to FIGS. 4-7.

A drive train 106 of vehicle 100 may include a transmission 108 (e.g., a gear box, gear train, etc.) coupled to one or more of the axles 104 of vehicle 100. The transmission 108 may be coupled to a rear axle of the axles 104, as shown in FIG. 1, to a front axle or to both axles, in other examples. The transmission 108 may translate speed and torque from a rotating source to the wheels 102 to propel vehicle 100. The present configuration includes at least two transmission input shafts and two electric machines. In the embodiments described herein, the electric machines are configured as a first traction motor 114 and a second traction motor 116. A first transmission input shaft 132 couples the first traction motor 114 and the transmission 108, and a second transmission input shaft 134 couples a second traction motor 116 and the transmission 108. Each of the first traction motor 114 and the second traction motor 116 may be mounted to an axle of the axles 104 via a motor mount. In this way, the first traction motor 114 and the second traction motor 116 each drive wheels of the vehicle positioned on the respective axle 104, as further described herein. In off-highway vehicle applications, a propshaft (not shown) may be included to mechanically couple output of the transmission to input of the axle, such as axles 104. Each of the wheels 102 may have a brake 110 coupled thereto that, when engaged, may halt or prevent rotation of the vehicle wheel.

In the embodiment shown in FIG. 1, the first traction motor 114 and the second traction motor 116 are positioned on a rear axle 104b of the axles 104 to provide rotational power to (e.g., drive) the wheels 102 of the rear axle. In some embodiments, traction motors may be positioned on a front axle 104a of the axles 104 to provide rotational power to the wheels of the front axle, as indicated by a first dashed box 138 and a second dashed box 140, each of which may represent the first traction motor 114 and the second traction motor 116, respectively, or may represent an additional traction motor (e.g., in addition to the first traction motor 114 and the second traction motor 116). In other embodiments, as further described herein with respect to FIG. 4, each of the first traction motor 114 and the second traction motor 116 may be positioned on different axles. For example, the first traction motor 114 may be positioned on the front axle 104a to provide rotational power to (e.g., drive) wheels 102 positioned thereon (e.g., as indicated by the first dashed box 138), and the second traction motor 116 may be positioned on the rear axle 104b to provide rotational power to (e.g., drive) wheels 102 positioned thereon. The transmission 108 may allow for selective torque distribution to the first traction motor 114 and the second traction motor 116, as further described with respect to FIGS. 4-7.

When configured as an EV, the rotating sources may be the first traction motor 114, and the second traction motor 116. In some examples, and as described herein, the first traction motor 114 and second traction motor 116 may be motor/generators, with a capacity to convert electrical energy into mechanical energy and vice versa. The first traction motor 114 and second traction motor 116 may be electrically coupled to a traction battery 120 of vehicle 100 to both draw power from the traction battery 120 and provide electrical energy to be stored at the traction battery 120. The vehicle 100 may be configured as a battery electric vehicle (BEV), wherein the first traction motor 114 and the second traction motor 116 may use chemical energy stored in a rechargeable battery pack (e.g., the traction battery 120) to propel the vehicle without assistance from a second source of propulsion, such as an engine. In some embodiments, the vehicle 100 may be configured as a hybrid electric vehicle (HEV) and include an engine 112, such as an internal combustion engine (ICE), as well as the first traction motor 114 and the second traction motor 116 to propel the vehicle.

The traction motors may be similarly configured, e.g., having similar operational speed and torque ranges, and thereby referred to as symmetric, or may have different speed and torque outputs, thereby referred to as asymmetric. As described herein, the first traction motor 114 and the second traction motor 116 are used for propulsion of the vehicle as well as generation of lower-frequency tactile energy (e.g., vibration). For example, lower-frequency may be considered between 5 Hz and 1,000 Hz.

Adjustment of the drive train between various modes as well as control of operations within each mode may be executed based on a vehicle control system 124, including a controller 126, as shown in FIG. 1. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions (e.g., computer readable instructions) executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first traction motor 114 and second traction motor 116 to measure motor speed and motor temperature, a pedal position sensor to detect a depression of an operator-actuated pedal, such as an accelerator pedal or a brake pedal, speed sensors at the wheels 102, etc. Vehicle acceleration is directly proportional to accelerator pedal position, for example, degree of depression. Upon receiving the signals from the various sensors 128 of FIG. 1, controller 126 processes the received signals, and employs various actuators 130 of vehicle 100 to adjust drive train operations based on the received signals and computer readable instructions stored on the memory of controller 126. For example, controller 126 may receive an indication of depression of the brake pedal, signaling a desire for decreased vehicle speed. In response, the controller 126 may command engagement of the brake 110 of at least one set of wheels 102. Additionally, the controller 126 may command operation of at least one of the traction motors as a generator to recharge the traction battery 120.

The vehicle 100 may further include an audio system 122 coupled to the controller 126. As further described with respect to FIGS. 2-3, the audio system 122 may include one or more audio sources 118, such as a radio, compact disc player, MP3 player, a video gaming system, a video system, combinations thereof, and so on. The audio system 122 may be coupled to the controller 126 such that, when an audio signal is generated by an audio source of the audio system, the audio signal may be used to generate a motor input command and the motor input command may be used by traction motors of the vehicle, such as the first traction motor 114 and the second traction motor 116, to generate lower-frequency tactile energy (e.g., vibration) of the vehicle. In some embodiments, the vehicle 100 may further include an auxiliary motor 136 which may be coupled to a steering wheel (not shown) to provide electric steering. The motor input command may be applied to the auxiliary motor 136 as well as the first traction motor 114 and the second traction motor 116 so that the auxiliary motor 136 may provide torque feedback to the steering wheel in accordance with the audio signal. A method for generating vibration of a vehicle system synchronous with audio signal is described with respect to FIGS. 4-7.

The audio system 122 may provide audio signal to an interior of the vehicle 100, such as playing music in a cabin (herein also referred to as a cab) of the vehicle 100. FIG. 2 shows a schematic diagram of a cabin 200 of a vehicle 202, which may be the vehicle 100 of FIG. 1. An audio system 222, which may be the audio system 122 of FIG. 1, may be implemented in the cabin 200 and include a plurality of speakers, user interfaces, and user input devices for selecting and/or adjusting an audio signal of the audio system.

The cabin 200 may include seating for one or more passengers, such as a first seat 204a, a second seat 204b, a third seat 204c, and a fourth seat 204d. In other embodiments, the cabin 200 may include more than or less than four seats. The vehicle may be a user-driven vehicle, wherein one of the passengers is a driver, or an autonomous vehicle, wherein all users are passengers.

The cabin 200 may be configured with an instrument panel 206, which may include various displays and controls accessible to a user of the vehicle 202. For example, instrument panel 206 may include a touch screen 208 of an in-vehicle computing system, and may be one embodiment of an audio system control panel. Touch screen 208 may receive user input to the in-vehicle computing system for controlling audio signal, visual display output, user preferences, control parameter selection, and so on. While the example system shown in FIG. 2 includes audio system controls that may be performed via a user interface of in-vehicle computing system, such as touch screen 208 without a separate audio system control panel, in other embodiments, the vehicle may include an audio system control panel, which may include controls for a conventional vehicle audio system such as a radio, compact disc player, MP3 player, and so on. The audio system controls may include features for controlling one or more aspects of audio signal via one or more speakers 212 of a vehicle speaker system. For example, the in-vehicle computing system or the audio system controls may control a volume of audio signal, a distribution of sound among the individual speakers of the vehicle speaker system, an equalization of audio signals, and/or any other aspect of the audio signal. In further examples, in-vehicle computing system 209 may adjust a radio station selection, a playlist selection, a source of audio signal (e.g., from radio or CD or MP3), and so on, based on user input received directly via touch screen 208, or based on data regarding the user (such as a physical state and/or environment of the user) received via one or more external devices (e.g., a mobile device). The in-vehicle computing system may further receive input from a user and adjust a selection of elements of the audio system which may be used for a lower-frequency tactile energy generating method. Briefly, corresponding vehicle vibration may be generated for a user selected audio source and vehicle vibration may not be generated for an unselected audio source. As further described with respect to FIGS. 4-7, lower-frequency tactile energy (e.g., vibration of the vehicle) may be generated synchronously with audio signal according to user selection, for example synchronously with audio signal from a radio and not generated for audio signal from a MP3 player.

The audio system 222 of the vehicle may include an amplifier 224 coupled to plurality of loudspeakers (e.g., speakers 212 and 232). In some embodiments, one or more hardware elements of in-vehicle computing system 209, such as touch screen 208, various control dials, knobs and buttons, memory, processor(s), and any interface elements (e.g., connectors or ports) may form an integrated head unit that is installed in instrument panel 206 of the vehicle. The head unit may be fixedly or removably attached in instrument panel 206. In additional or alternative embodiments, one or more hardware elements of in-vehicle computing system 209 may be modular and may be installed in multiple locations of the vehicle. Cabin 200 may also include one or more user objects, such as a mobile device 228, that are stored in the vehicle before, during, and/or after travelling. Mobile device 228 may include a smart phone, a tablet, a laptop computer, a portable media player, and/or any suitable mobile computing device. Mobile device 228 may be connected to in-vehicle computing system via a wired (e.g., via Universal Serial Bus (USB), Mobile High-Definition Link (MHL), High-Definition Multimedia Interface (HDMI), Ethernet, and so on) or wireless (e.g., via Bluetooth®, Wi-Fi®, Wi-Fi Direct®, Near-Field Communication (NFC), cellular connectivity, and so on) connection configured to provide two-way communication between the mobile device and the in-vehicle computing system. (Bluetooth® is a registered trademark of Bluetooth SIG, Inc., Kirkland, WA. Wi-Fi® and Wi-Fi Direct® are registered trademarks of Wi-Fi Alliance, Austin, Texas.) Mobile device 228 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, a communication link may provide sensor and/or control signals from various vehicle systems (such as vehicle audio system, climate control system, and so on) and touch screen 208 to mobile device 228 and may provide control and/or display signals from mobile device 228 to the in-vehicle systems and touch screen 208.

The cabin 200 may further include passenger speakers 232 positioned on or embedded in the seating for one or more passengers (e.g., the first seat 204a, the second seat 204b, the third seat 204c, and the fourth seat 204d). In some embodiments, the first seat 204a and the second seat 204b may each be configured with a passenger screen and speaker system 211 which faces the passenger seats positioned behind the first seat 204a and the second seat 204b (e.g., the fourth seat 204d and the third seat 204c, respectively). Additional screens and/or speakers may be positioned around the cabin 200. Other configurations for a cabin of a vehicle, including a different number of seats, different seat positioning, a different number/configuration of speakers and/or screens, and so on are possible without departing from scope of the present disclosure.

Figure 3:
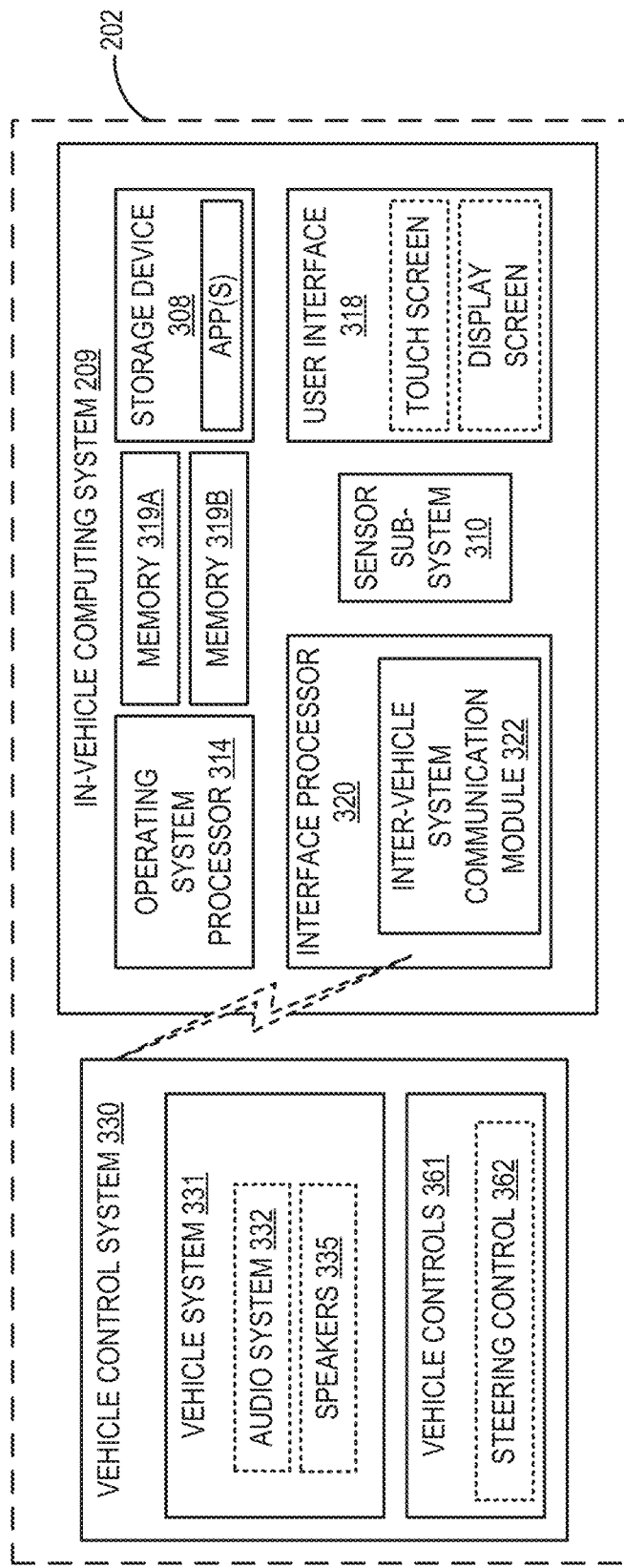
FIG. 3 is a block diagram of a control system for a vehicle, such as the vehicle of FIGS. 1-2.

FIG. 3 shows a block diagram of the in-vehicle computing system 209 configured and/or integrated in the vehicle 202 of FIG. 2. In-vehicle computing system 209 may perform one or more of the methods described herein in some embodiments. In some examples, the in-vehicle computing system may be a vehicle system configured to provide information-based media content (audio and/or visual media content, including entertainment content, navigational services, and so on) to a vehicle user to enhance the operator's in-vehicle experience. In-vehicle computing system 209 may include, or be coupled to, various vehicle systems, sub-systems, hardware components, as well as software applications and systems that are integrated in, or integratable into, vehicle 202 in order to enhance an in-vehicle experience for a driver and/or a passenger.

In-vehicle computing system 209 may include one or more processors including an operating system processor 314 and an interface processor 320. Operating system processor 314 may execute an operating system on in-vehicle computing system 209, and control input/output, display, playback, and other operations of the in-vehicle computing system 209. Interface processor 320 may interface with a vehicle control system 330 via an inter-vehicle system communication module 322.

Inter-vehicle system communication module 322 may output data to one or more other vehicle systems 331 and/or one or more other vehicle control elements 361, while also receiving data input from other vehicle systems 331 and other vehicle control elements 361, e.g., by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), and digital signals propagated through vehicle data networks (such as a multimedia data network through which multimedia data is communicated between multimedia components in the vehicle). For example, in-vehicle computing system 209 may retrieve a power state of the vehicle via a battery and/or power distribution system of the vehicle, an ignition state of the vehicle, and so on. In addition, other interfacing means such as Ethernet may be used as well without departing from the scope of this disclosure.

A storage device 308 may be included in in-vehicle computing system 209 to store data such as computer readable instructions executable by operating system processor 314 and/or interface processor 320 in non-volatile form. Storage device 308 may store application data, including prerecorded sounds, to enable in-vehicle computing system 209 to run an application for connecting to a cloud-based server and/or collecting information for transmission to the cloud-based server. The application may retrieve information gathered by vehicle systems/sensors, input devices (e.g., a user interface 318), data stored in one or more storage devices, such as a volatile memory 319A or a non-volatile memory 319B, devices in communication with the in-vehicle computing system (e.g., a mobile device connected via a Bluetooth® link), and so on. In-vehicle computing system 209 may further include the volatile memory 319A. Volatile memory 319A may be random access memory (RAM). Non-transitory storage devices, such as non-volatile storage device 308 and/or non-volatile memory 319B, may store instructions and/or code that, when executed by a processor (e.g., operating system processor 314 and/or interface processor 320), controls in-vehicle computing system 209 to perform one or more of the actions described in the disclosure.

One or more additional sensors may be included in a sensor subsystem 310 of in-vehicle computing system 209. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, and so on.

Vehicle control system 330 may include controls for controlling aspects of various vehicle systems 331 involved in different in-vehicle functions. These may include, for example, controlling aspects of vehicle audio system 332 for providing audio entertainment to the vehicle occupants as well as aspects of a telecommunication system for enabling vehicle occupants to establish telecommunication linkage with others.

Audio system 332 may include one or more acoustic reproduction devices including electromagnetic transducers such as one or more speakers 335 (e.g., speakers 212 and 232 of FIG. 2). Vehicle audio system 332 may be passive or active such as by including a power amplifier. In some examples, in-vehicle computing system 209 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Vehicle control system 330 may also include controls for adjusting the settings of various vehicle control elements 361 (or vehicle controls, or vehicle system control elements) related to the engine, traction motors, and/or auxiliary elements within a cabin of the vehicle, such as one or more steering wheel controls 362 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 361 may also include internal traction motor and vehicle operation controls that are configured to receive instructions via the CAN bus of the vehicle to change operation of one or more of the engine, traction motors, exhaust system, transmission, and/or other vehicle system. The control signals may also control audio signal at one or more speakers 335 of vehicle audio system 332. For example, the control signals may adjust audio signal characteristics such as volume, equalization, audio image (e.g., the configuration of the audio signals to produce audio signal that appears to a user to originate from one or more defined locations), audio distribution among a plurality of speakers, and so on.

One or more elements of in-vehicle computing system 209 may be controlled by a user via user interface 318. User interface 318 may include a graphical user interface presented on a touch screen, such as touch screen 208 and/or passenger screen and speaker system 211 of FIG. 2, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system 209 and mobile device 228 via user interface 318. In addition to receiving a user's vehicle setting preferences on user interface 318, vehicle settings selected by in-vehicle control system 330 may be displayed to a user on user interface 318. Notifications and other messages (e.g., received messages), as well as navigational assistance, may be displayed to the user on a display of the user interface. User preferences/information and/or responses to presented messages may be performed via user input to the user interface.

A method for generating vibration of a vehicle system (e.g., the vehicle 100 of FIG. 1) synchronous with audio signal output by an audio source of the audio system (e.g., audio system 122 of FIG. 1, audio system 332 of FIG. 3) is described with respect to FIGS. 4-7. Briefly, the method may be implemented by the in-vehicle computing system 209 of FIGS. 2 and 3 and includes receiving an audio signal from an audio source, generating a motor input command based on the audio signal, and implementing the motor input command in at least one traction motor (e.g., the first traction motor 114 and/or the second traction motor 116 of FIG. 1) when the vehicle is in a park mode (e.g., brakes 110 engaged), such that the traction motor(s) generates lower-frequency tactile energy which vibrates the vehicle system. The motor input command may be generated for audio signals from a first group of audio sources and may not be generated for a second group of audio sources. For example, the first group of audio sources may include CD, radio, and video game audio. Audio sources of the first group of audio sources may be pre-selected by an audio system manufacturer and/or may be selected by a user of the vehicle, such as a driver and/or a passenger (e.g., user selected audio source). The second group of audio sources may include audio from a phone and GPS, for example. Thus, audio signals from an unselected audio source or group of unselected audio sources may not be used to generate a motor input command, such that vibration of the vehicle system is implemented for selected audio sources. In some embodiments, different motor input commands may be generated for and distributed to each of a first traction motor and a second traction motor based on a user input, a configuration of the drivetrain (e.g., positioning of the traction motors on axles of the vehicle), and so on, as further described with respect to FIGS. 4-7.

Figure 4:
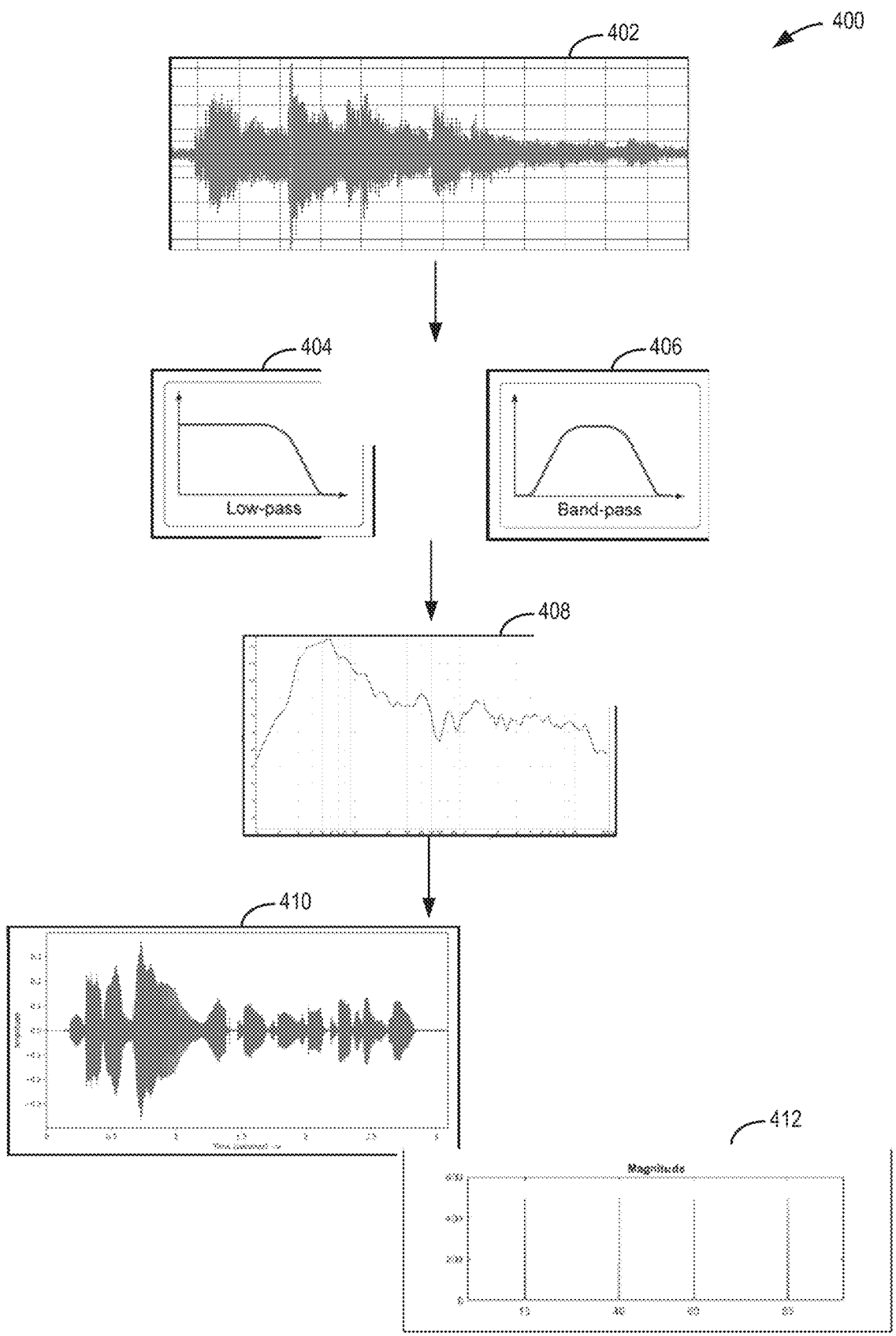
FIG. 4 is a workflow for generating a motor input command from an audio signal of an audio source.

FIG. 4 shows a workflow 400 for generating a motor input command based on an audio signal. Workflow 400 includes a plurality of graphs which may be used to visualize an embodiment of the workflow 400 for a given audio signal. An audio signal graph shown in workflow 400 may be representative of a potential audio signal waveform, for example, of a song played by a radio, CD, or MP3 audio source, and different audio signals may be used to generate a motor input command without departing from the scope of the present disclosure. Additionally, the motor input command shown in the workflow 400 may be representative of a potential motor input command generated according to the workflow 400 based on the shown audio signal graph, and different motor input commands may be generated for respective audio signals without departing from the scope of the present disclosure. A method for generating a motor input command from an audio signal, such as may be used in the workflow 400, is described in further detail with respect to FIG. 6.

The workflow 400 includes acquiring an audio signal. As described herein, the audio signal may be from video, music, podcasts, audiobooks, games, phone calls, vehicle chimes, notifications, and so on. The audio signal may be sourced from an audio source of the audio system (e.g., the audio system 122 of FIG. 1 and/or the audio system 332 of FIG. 3), including CD, DVD, AM/FM/Satellite radio, cloud streaming services, wired devices, a Bluetooth device coupled to the vehicle audio system, or other audio signal transfer method. The audio signal is represented as an audio signal graph 402 indicating sound frequency visualized as a waveform (e.g., frequency as an amplitude of the graph through time, indicated by the abscissa). Alternatively, the audio signal graph 402 may indicate a volume of audio signal by the audio source.

The audio signal (e.g., shown by the audio signal graph 402) is processed using a low-pass filter 404 and/or a band-pass filter 406 to give a processed audio signal. The processed audio signal is represented as a processed audio signal graph 408. Wherein the audio signal is displayed as a waveform in the audio signal graph 402, the processed audio signal graph 408 shows the processed audio signal as a non-linear curved line graph which may represent frequency changes in the audio signal, including frequency maximums and minimums. For example, when the audio signal is processed using the low-pass filter 404, signals of the audio signal with a frequency less than a selected cutoff frequency are passed through the low-pass filter 404 and may be represented in the processed audio signal graph 408. Signals of the audio signal with a frequency greater than the selected cutoff frequency may be attenuated and not represented in the processed audio signal graph 408. The selected cutoff frequency may be 50 Hz, in some embodiments. When the audio signal is processed using the band-pass filter 406, signals of the audio signal having frequencies within a given range are passed through the filter and signals with frequencies outside of the given range are attenuated (e.g., not included in the processed audio signal graph 408). For example, the given range may be between 0 Hz and 50 Hz.

If an amplitude of the processed audio signal is greater than a trigger threshold, generation of the motor input command is triggered. The trigger threshold may be a non-zero, positive desired low frequency energy amplitude, for example, audio signals which are greater than 70-80 dB (unweighted) in a given frequency range may trigger motor actuation (e.g., generation of the motor input command used to trigger motor actuation).

The workflow 400 shows two example graphs of motor input commands. A first motor input command 410 may be a waveform similar to the audio signal graph 402 and shows amplitude along the ordinate and time along the abscissa. A waveform shape (e.g., amplitudes through time) of the first motor input command 410 may be approximately equivalent to a waveform shape of the audio signal graph 402. In this way, vibration of the vehicle (e.g., generated when the motor input command is sent to the traction motor, as further described herein) may be temporally aligned (e.g., synchronized) with the audio signal. An intensity of vibration may be correlated with a volume of the audio signal, in some embodiments. In other embodiments, vibration may have a preset intensity level and a frequency of vibration may be correlated with the audio signal, such that the vehicle vibrates in tandem with the audio signal being output by the vehicle audio system. A second motor input command 412 may include a plurality of signals having a preset magnitude, wherein a frequency of the plurality of signals is correlated with the audio signal. For example, each of the plurality of signals may correspond with a frequency of the audio signal which exceeds the trigger threshold. As further described with respect to FIG. 6, the first motor input command 410 (e.g., as a waveform) may be generated for a first vibration generation mode and the second motor input command 412 (e.g., as a plurality of signals with preset magnitude) may be generated for a second vibration generation mode.

The motor input command (e.g., the first motor input command 410 and/or the second motor input command 412) may be sent to the controller (e.g., the controller 126 of FIG. 1 and/or the vehicle control system 330 of FIG. 3) which may command operation of the traction motors of the vehicle to generate lower-frequency tactile energy (e.g., vibration) based on the motor input command. The motor input command may be distributed differently among a plurality of traction motors depending on a configuration of the vehicle drivetrain, as described with respect to FIG. 1 and further described with respect to FIGS. 5A and 5B. For example, motor input commands to various traction motors may be in phase, out of phase, or of variable phase.

Figure 5A:
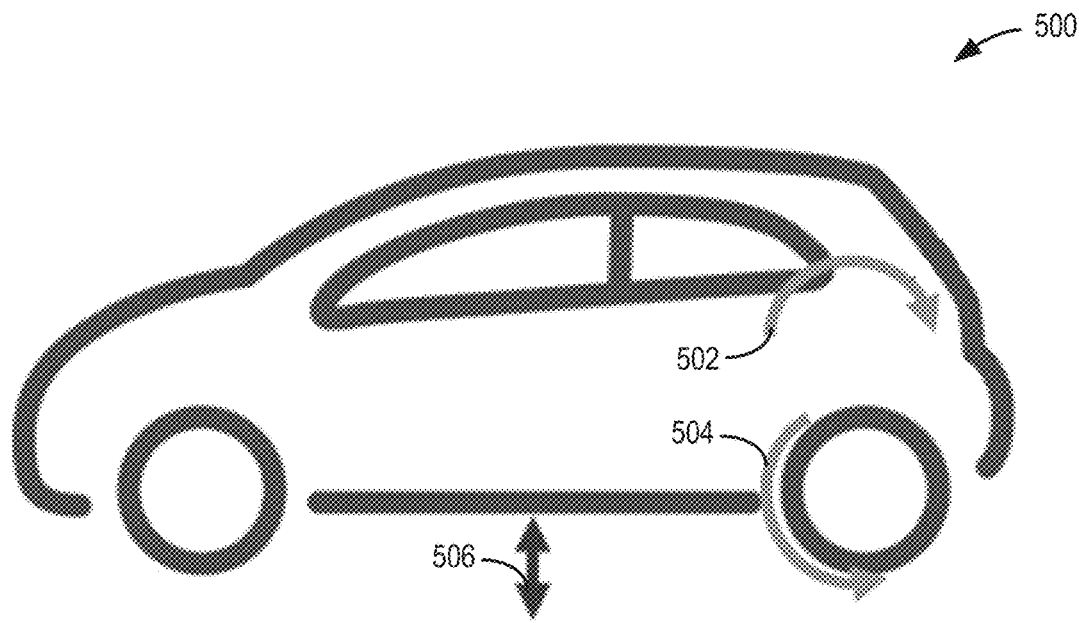
FIG. 5A shows schematic diagrams indicating a first distribution of motor torque and a second distribution of motor torque in different vehicle configurations.
Figure 5A:
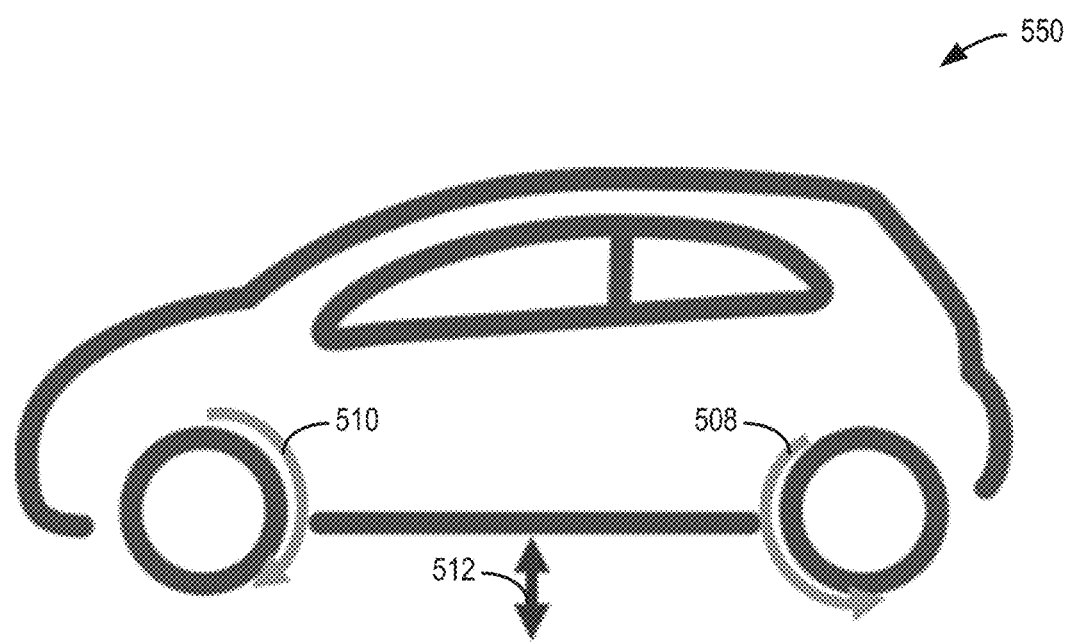
Figure 5A:
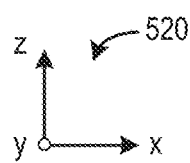

FIG. 5A shows a first distribution of motor torque 500 and a second distribution of motor torque 550 in a vehicle, such as the vehicle 202 of FIG. 2. The first distribution of motor torque 500 may occur when a first traction motor and a second traction motor (e.g., the first traction motor 114 and the second traction motor 116 of FIG. 1) are positioned on a single axle (e.g., the rear axle of the axles 104 of the vehicle 100 of FIG. 1). As further described with respect to FIG. 7, the controller may command persistent torque (e.g., DC torque) to be applied to the first traction motor and/or the second traction motor based on the motor input command to preload motor mounts, and further command fluctuating torque (e.g., AC torque) to be applied to the traction motors to generate vibration when the vehicle is in park, as may be indicated by a sensor (e.g., a park lock sensor).

In the first distribution of motor torque 500, wheel torque is reacted by a corresponding body reaction torque. For example, wheels on the axle not having the first traction motor and the second traction motor positioned thereon (e.g., the front axle) may be locked to reduce directional vehicle motion during generation of vibration (e.g., such that the vehicle may not move from its stationary or parked position). In some embodiments, the method for generating vehicle vibration based on the motor input command, as further described with respect to FIG. 7, may include determining if a mu value (e.g., a value indicating friction between a wheel of the vehicle and a driving surface) is below a mu threshold. For example, the mu threshold may be a non-zero, positive value which indicates a friction level below which the vehicle may undesirably move when vibration is generated, even though the vehicle may be in a park mode (e.g., a park lock engaged). If the mu value is below the mu threshold, the method for generating vibration may be canceled. If the vehicle is in the park mode and the mu value is greater than or equal to the mu threshold, static torque may be provided to the wheels of the axle on which the first traction motor and the second traction motor are positioned. The static torque may overcome isolation and lash as well as generate desired shaking oscillation (e.g., vibration) of the vehicle. Reacted wheel torque, as shown by a first arrow 502, and static torque, as shown by a second arrow 504, may result in a vertical response of the vehicle, as shown by a third arrow 506, thus generating tactile motion of the vehicle which is synchronized with audio signal (e.g., a resultant vibrational force). For example, an axis system 520 is provided in FIG. 5A, as well as FIG. 5B, for reference. The z-axis may be a vertical axis (e.g., parallel to a direction of gravity), the y-axis may be a lateral axis (e.g., horizontal axis), and the x-axis may be a longitudinal axis, in one example. However, the axes may have other orientations, in other examples.

In the second distribution of motor torque 550, the first traction motor may be positioned on the front axle and the second traction motor may be positioned on the rear axle.

Wheel torque on the rear axle from the second traction motor positioned thereon may be static to overcome isolation and lash, as well as provide desired shaking oscillation. A direction of wheel torque on the rear axle is indicated by a fourth arrow 508. Wheel torque on the front axle with the first traction motor positioned thereon may be equal in magnitude to wheel torque on the rear axle and in an opposite direction, as indicated by a fifth arrow 510. In this way, opposing wheel torque may generate vertical translation of the vehicle, as indicated by a sixth arrow 512. Vertical translation (e.g., vibration) of the vehicle generated when opposing wheel torque is generated by traction motors on different axles of the vehicle (e.g., the second distribution of motor torque 550) may have a greater magnitude than vibration generated by traction motors on the same axle (e.g., the first distribution of motor torque 500).

In some embodiments, distribution of motor torque may be different between traction motors positioned on different axles. For example, a first traction motor on a rear axle may have a greater maximum torque output and/or a higher bandwidth for torque than a second traction motor on a front axle. Different motor signals may be sent to the first traction motor and the second traction motor, such that the first traction motor generates more vertical translation (e.g., vibration) compared to the second traction motor. In some embodiments where both the first traction motor and the second traction motor are positioned on the same axle (e.g., the first distribution of motor torque 500), a different amount of motor torque may be applied to each of the first traction motor and the second traction motor. Further, in some embodiments, an auxiliary motor may be coupled to a steering wheel to provide power steering. A motor signal may be sent to the auxiliary motor as well as to traction motors positioned on at least one axle of the vehicle, such that the steering wheel may also provide tactile energy (e.g., vibration) synchronous with audio signal.

Figure 5B:
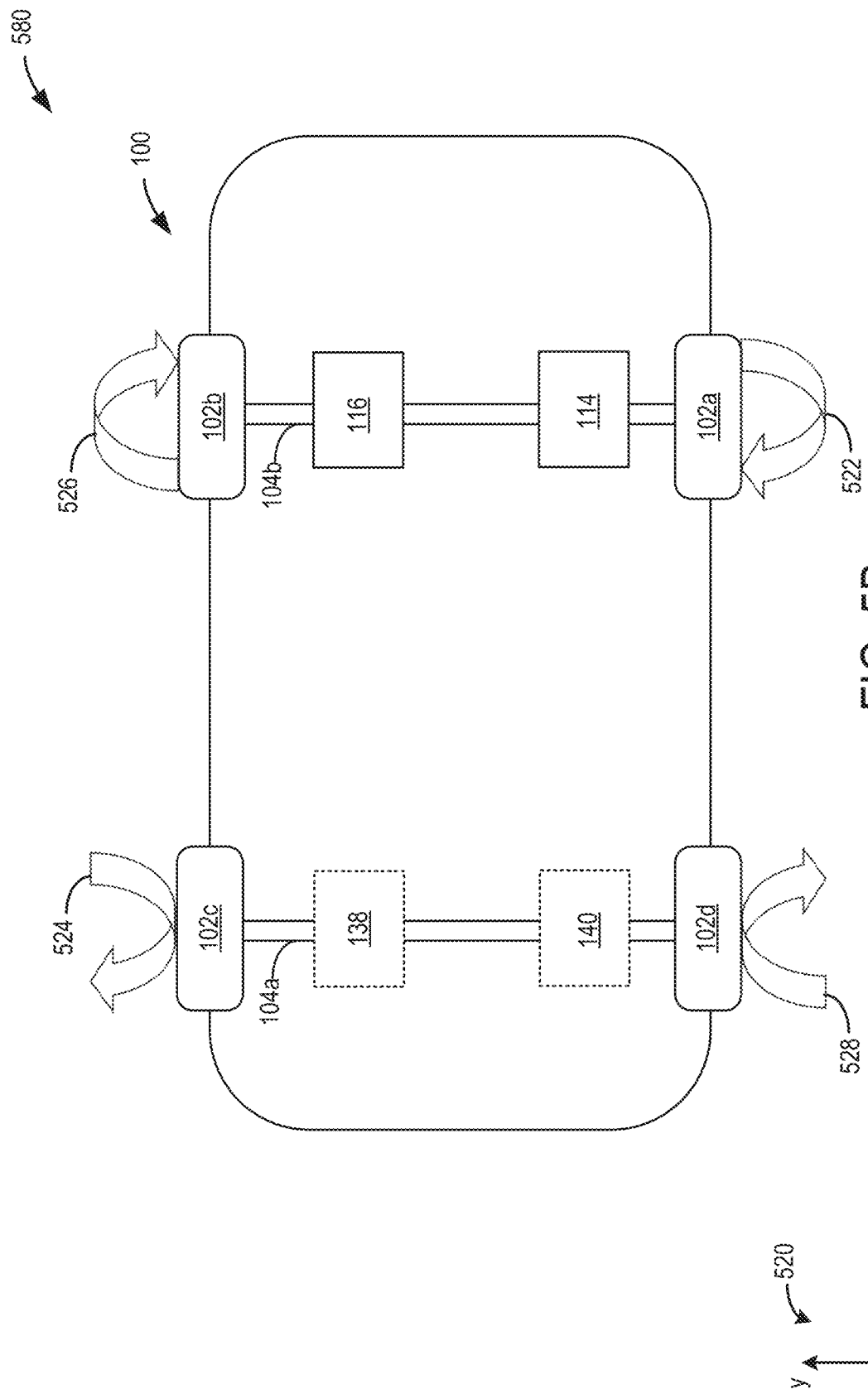
FIG. 5B shows a schematic diagram indicating a third distribution of motor torque.

Turning to FIG. 5B, a third distribution of motor torque 580 is shown. As briefly described with respect to FIG. 1, in some embodiments, traction motors may be positioned on the front axle 104a to provide rotational power to the wheels of the front axle 104a and traction motors may further be positioned on the rear axle 104b to provide rotational power to the wheels of the rear axle 104b. The embodiment of the vehicle 100 shown in FIG. 5B includes the first traction motor 114 and the second traction motor 116 on the rear axle 104b. Additionally, the first dashed box 138 and the second dashed box 140 each represent an additional traction motor, for example, a third traction motor and a fourth traction motor, respectively, positioned on the front axle 104a. In some embodiments, the vehicle 100 may include three traction motors (e.g., a combination of three of the first traction motor 114, the second traction motor 116, the third traction motor as indicated by the first dashed box 138, and the fourth traction motor as indicated by the second dashed box 140). In other embodiments, the vehicle 100 includes the four traction motors described herein (e.g., the first traction motor 114, the second traction motor 116, the third traction motor as indicated by the first dashed box 138, and the fourth traction motor as indicated by the second dashed box 140). Both when the vehicle 100 is configured with three traction motors and configured with four traction motors, each of the three or four traction motors may be actuated using motor input signals which may result in vertical, lateral, and/or longitudinal vibrational forces (e.g., a resultant vibrational force) on the body of the vehicle 100. For example, as described with respect to FIG. 5A and further described with respect to FIGS. 6 and 7, each of the wheels 102 may be locked (e.g., the vehicle may be in a park mode with a park lock engaged) and different motor signals or the same motor signal (e.g., motor input command) may be sent to each of the three or four traction motors to generate vibration.

In the third distribution of motor torque 580, each of the four traction motors may be dedicated to a single wheel of the set of wheels 102. For example, the first traction motor 114 may be coupled to, and thus provide rotational power to a first wheel 102a of the set of wheels 102. The second traction motor 116 may be coupled to a second wheel 102b, the third traction motor (e.g., as indicated by the first dashed box 138) may be coupled to a third wheel 102c, and the fourth traction motor (e.g., as indicated by the second dashed box 140) may be coupled to a fourth wheel 102d.

A different motor input command may be sent to each of the four traction motors to impart vibration when each of the set of wheels 102 are locked (e.g., park lock applied to the axle and/or brake applied to the wheel). The different motor input commands may be sent to each of the four traction motors out of phase, which may result in induced lateral vibration as well as vertical and/or longitudinal vibration (e.g., a resultant vibrational force). For example, a first motor input command applied to the first traction motor 114 and a third motor input command applied to the third traction motor (e.g., as indicated by the first dashed box 138) may command torque to be applied to a respective wheel in a first direction (e.g., a first rotational direction, such as clockwise), as indicated by a first curved arrow 522 and a third curved arrow 524, respectively. A second motor input command applied to the second traction motor 116 and a fourth motor input command applied to the fourth traction motor (e.g., as indicated by the second dashed box 140) may command torque to be applied to a respective wheel in a second direction different from the first direction (e.g., a second rotational direction, such as counterclockwise), as indicated by a second curved arrow 526 and a fourth curved arrow 528, respectively. The different directions of torque applied to the set of wheels 102 may impart vertical, lateral, and longitudinal vibration of the vehicle 100. As described with respect to the axis system 520, lateral vibration of the vehicle 100 may be vibration in a direction parallel with the y-axis, vertical vibration may be in a direction parallel with the z-axis, and longitudinal vibration may be in a direction parallel with the x-axis. In embodiments where the vehicle 100 is configured with three traction motors, as described above, three of the four motor input commands may be applied to respective traction motors of the vehicle 100 to induce vibration, as described herein.

Figure 6:
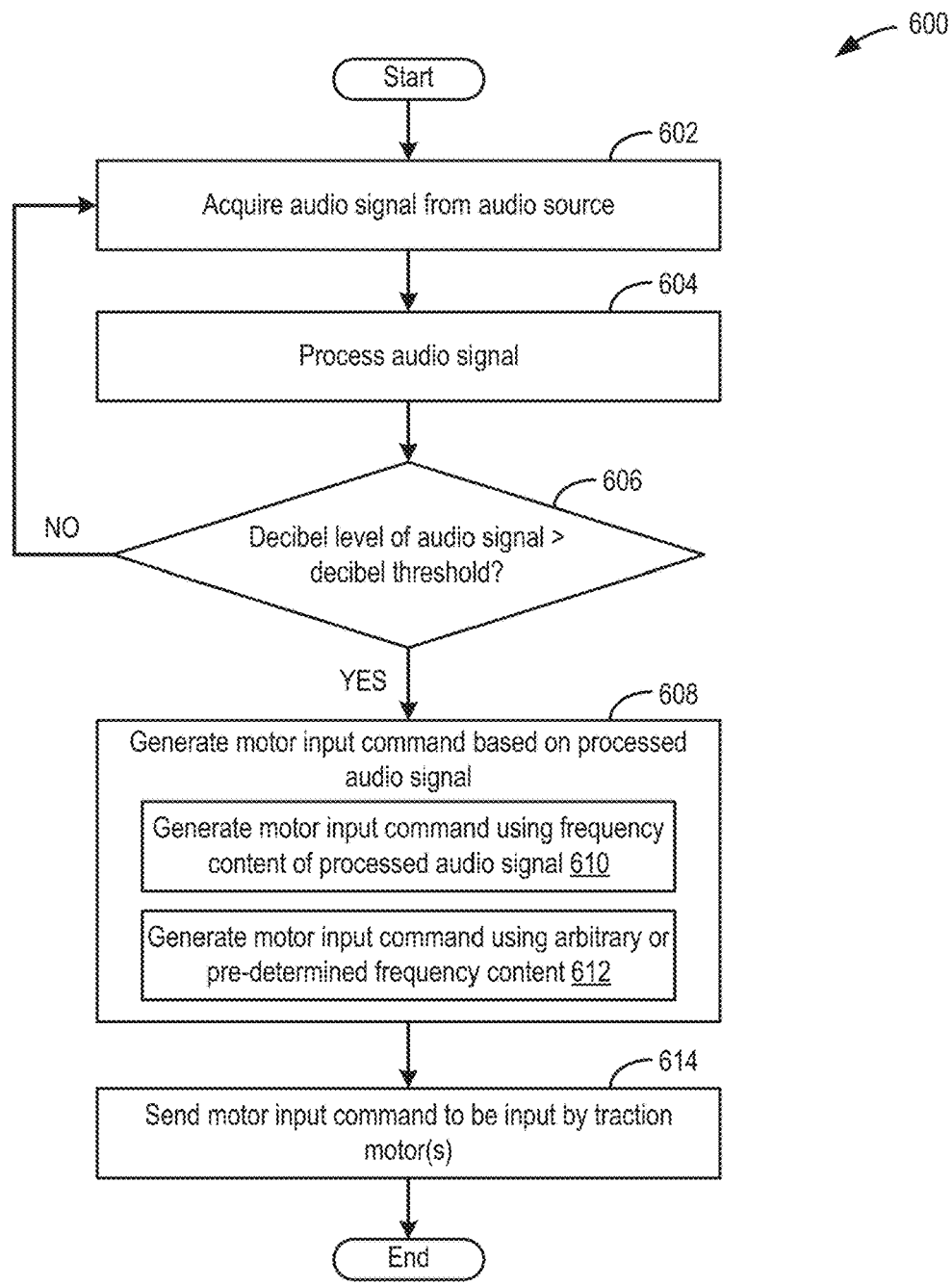
FIG. 6 illustrates a method for generating a motor input command from an audio signal of an audio source.

FIG. 6 illustrates a method 600 for generating a motor input command from an audio signal of an audio source. The audio source may be a radio, video gaming console, or any other audio source which is part of an audio system of a vehicle, such as the audio system 122 of the vehicle 100 of FIG. 1. Instructions for carrying out the method 600 and the rest of the methods included herein may be executed by a controller based on instructions (e.g., computer readable instructions) stored on memory of the controller and in conjunction with signals received from sensors of the vehicle system, such as the sensors described above with reference to FIGS. 1-3. The controller may employ actuators of the vehicle system to adjust traction motor operation, according to the methods described below.

At 602, the method 600 includes acquiring an audio signal from an audio source. The audio source may be a CD, DVD, AM/FM/Satellite radio, cloud streaming service, wired device, Bluetooth device, or other data transfer method of the audio system of the vehicle. The audio signal may be a purposeful notification signal, from video, music, podcasts, audio books, games, phone calls, vehicle chimes, notifications, and so on.

At 604, the method 600 includes processing the audio signal. The audio signal may be processed using a low-pass filter with a cutoff frequency. The cutoff frequency may be approximately 50 Hz, in some embodiments. In other embodiments, the cutoff frequency may be greater than or less than 50 Hz. Additionally or alternatively, the audio signal may be processed with a band-pass filter. When the audio signal is processed using the band-pass filter, signals of the audio signal having frequencies within a given range are passed through the filter and signals with frequencies outside of the given range are attenuated (e.g., not included in the processed audio signal graph 408). For example, the given range may be between 0 Hz and 50 Hz.

At 606, the method 600 includes determining if a decibel level of the processed audio signal is greater than a decibel threshold. If the decibel level is not greater than decibel threshold, the method 600 returns to operation 602 to acquire audio signal from the audio source without generating a motor input command for the present audio signal. In some embodiments, the decibel threshold may be a non-zero, positive value equivalent to the cutoff frequency of the low-pass filter and/or the given range of the band-pass filter, and a motor input command may be generated for all signals of the audio signal which pass through the respective filter. Alternatively, the decibel threshold may be separate from the low-pass filter and/or the band-pass filter. For example, the decibel threshold may be a non-zero, positive decibel level above which the audio signal is loud and/or significant enough to be heard by a user in the cabin of the vehicle (e.g., cabin 200 of FIG. 2).

If the audio signal is greater than the decibel threshold, the method 600 includes generating motor input command based on the processed audio signal at 608 to be sent to the traction motors. In some embodiments, at 610, the method 600 includes generating the motor input command using frequency content of the processed audio signal. For example, as shown in the first motor input command 410 of FIG. 4, the motor input command may be a waveform similar to that of the audio signal from which the motor input command is generated. When the motor input command is generated in this way, an intensity of vehicle vibration (e.g., lower-frequency tactile energy generated by the traction motors) may correspond with an intensity (e.g., volume) of the audio signal. Generating the motor input command using frequency content of the processed audio signal may include additional processing of the audio signal. For example, additional processing may include determining frequency-dependent amplitude of the motor input command (e.g., an intensity of the vibration), band-pass filtering specific frequencies aligning with known vehicle modes, phase shifting select frequencies to create a more realistic response, and so on. For example, generating a more realistic response may include generating a first motor input command for a first traction motor positioned on a first axle of the vehicle (e.g., as described with respect to FIG. 5A) and generating a second motor input command for a second traction motor positioned on a second axle of the vehicle. The first motor input command may be different from the second motor input command, for example, may generate a more frequent and/or more intense vibration of the vehicle. This may be implemented when distribution of the audio signal (e.g., via speakers, as described with respect to FIG. 2) is distributed such that different audio signals are output via speakers in different locations around the cabin. The first motor signal for the first axle may generate a first intensity and/or frequency of vibration at a front of the vehicle when the first axle is the front axle, and the second motor signal for the second axle may generate a second intensity and/or frequency of vibration at a rear of the vehicle when the second axle is the rear axle. The different intensities and/or frequencies generated in different regions of the vehicle may correspond with distribution of the audio signals.

In other embodiments, at 612, the method 600 may include generating motor input command using arbitrary and/or pre-determined frequency content. In these embodiments, the processed audio signal may act as a trigger, such that generation of motor input command is triggered when the processed audio signal exceeds a trigger threshold. For example, as described with respect to FIG. 4, the trigger threshold may be a non-zero, positive desired low frequency energy amplitude, such as audio signals which are greater than 70-80 dB (unweighted) in a given frequency range. An arbitrary motor input command may be a signal comprised of a small number of frequencies or a purposefully shaped spectral content, in some embodiments. The pre-determined frequency content may be pre-determined shaped spectral content. Generation of motor input command using frequency content of the processed audio signal or using arbitrary and/or pre-determined frequency content may be selected by a user, determined by a controller based on an audio source generating the audio signal, and so on.

At 614, the method 600 include sending the motor input command to be input by the traction motors. For example, the motor input command generated by the method 600 may be output by the in-vehicle computing system 209 of FIGS. 2 and 3 and be received by the vehicle control system 330, which may command torque distribution to the first traction motor and the second traction motor according to the motor input command. The method 600 may be continuously implemented, wherein audio signals are processed in real time such that corresponding vibration of the vehicle based on generated motor input command occurs synchronously with output of the audio signal (e.g., from speakers in a cabin of the vehicle). Briefly returning to FIG. 4 and particularly to the audio signal graph 402, the method 600 may be implemented continuously such that each peak of the waveform of the audio signal may be processed according to the method 600. If the motor input command is generated based on frequency of the audio signal, the motor input command may be sent to the traction motor(s) as the motor input command is generated. If the motor input command is generated is the arbitrary motor input command signal (e.g., the second motor input command 412 of FIG. 4), the motor input command may be sent to the traction motor(s) whenever the audio source creates an audio signal which trips the trigger (e.g., the decibel level of the processed audio input is greater than the decibel threshold).

Figure 7:
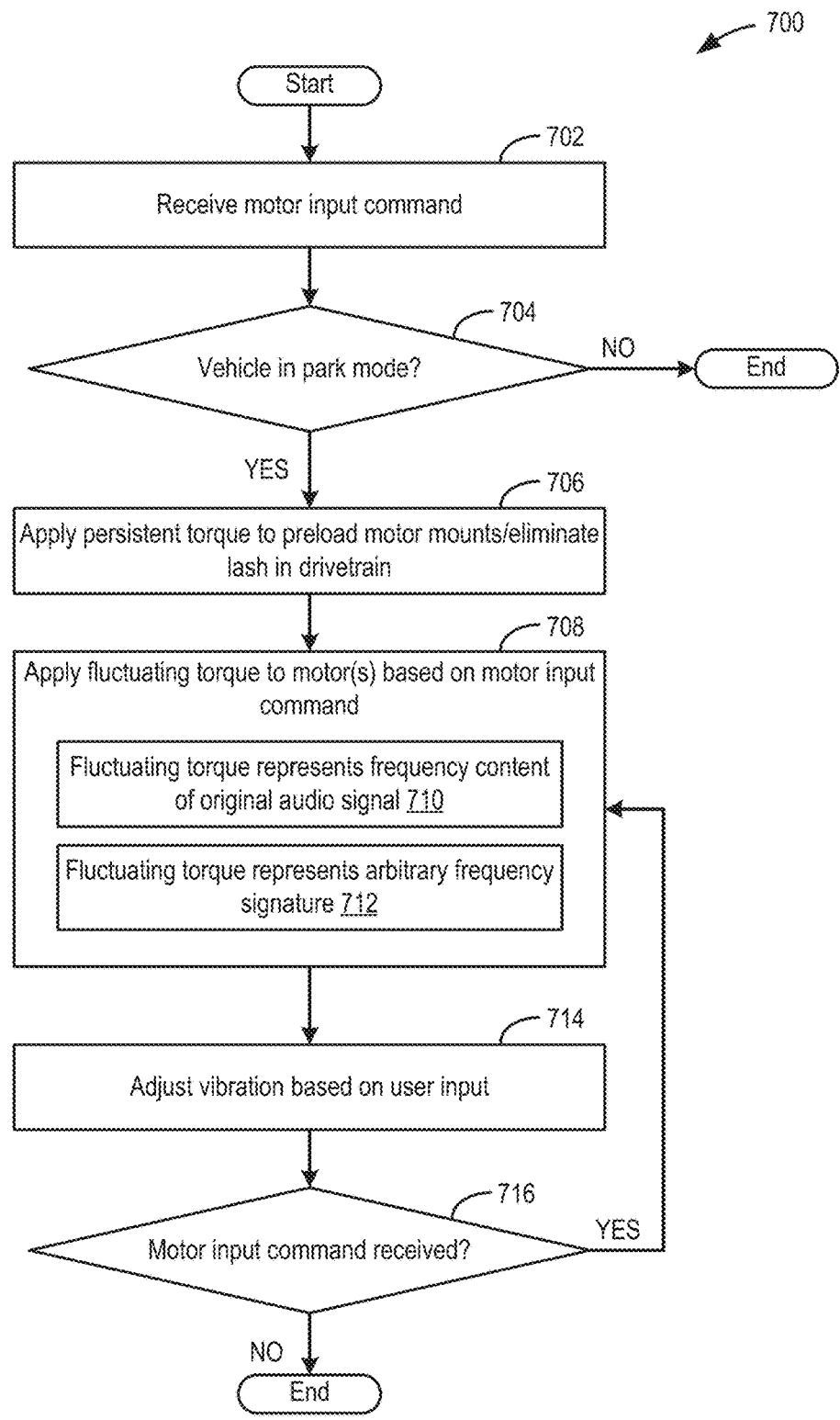
FIG. 7 illustrates a method for implementing a motor input command to generate lower-frequency tactile energy based on an audio signal.

Turning now to FIG. 7, a method 700 is illustrated for generating lower-frequency tactile motion (e.g., vibration) of a vehicle by implementing a motor input command at the traction motor(s). At 702, the method 700 includes receiving the motor input command. In some embodiments, the motor input command may be generated by the in-vehicle computing system 209 (e.g., of FIGS. 2 and 3) and sent to the vehicle control system 330 to be implemented. In other embodiments, the motor input command may be generated and implemented by a single controller of the vehicle. The motor input command may be generated according to the method 600 and as visualized in FIG. 4. The motor input command may be generated using frequency content of a processed audio signal and may thus be configured as a waveform similar to that of the audio signal. Alternatively, the motor input command may be generated using arbitrary or pre-determined frequency content, wherein the processed audio signal functions as a trigger to generate the motor input command when the processed audio signal trips a trigger. As further described herein, each of the types of motor input commands may command different actuation of a traction motor.

At 704, the method 700 includes determining if the vehicle is in a park mode. For example, the vehicle may be determined to be in the park mode when each wheel hub is held in a position to resist torque input. For example, a service brake, a parking brake, a wheel brake (e.g., the brake 110 described with respect to FIG. 1) and so on may be engaged. As briefly described with respect to FIGS. 5A and 5B, engagement of the park mode may prevent undesired translational motion of the vehicle (e.g., where the wheels rotate and the vehicle moves in a forward or reverse direction) when vibration of the vehicle is generated. If vehicle is not in park mode, the method 700 may end.

If the vehicle is in the park mode, at 706 the method 700 includes applying persistent torque (e.g., DC torque) to preload motor mounts of the traction motor(s) which are to generate vibration in subsequent operations of the method 700. For example, a first motor mount of the first traction motor on the rear axle may have persistent torque applied thereto, which may eliminate lash in the drivetrain. Additionally or alternatively, a second motor mount of the second traction motor on the rear axle or on the front axle may have persistent torque applied thereto. A level of persistent torque applied may be 15-45 Newton-meter (Nm).

Following preloading of the motor mount(s), at 708 the method 700 includes applying fluctuating torque to the traction motor(s) based on motor input command. As briefly described with respect to FIGS. 4 and 5, traction motors may be positioned on the same axle or on different axles of the drivetrain. Both when the traction motors are positioned on the same axle and when the traction motors are positioned on different axles, the motor input command used to command actuation of each traction motor may be the same or may be different. For example, a first motor input command may be applied to both the first traction motor and the second traction motor, both of which are positioned on the rear axle. The first motor input command may be applied such that an amount of fluctuating torque commanded by the first motor input command is applied to each of the first traction motor and the second traction motor. Alternatively, the amount of fluctuating torque commanded by the first motor input command may be divided equally between and applied to the first traction motor and the second traction motor. In some embodiments, a second motor input command different from the first motor input command may be applied to the second traction motor. These scenarios may also be implemented when the first traction motor and the second traction motor are positioned on different axles. For example, the same motor input command may be applied to each of the first traction motor and the second traction motor to command a same amount of fluctuating torque. In embodiments where the first traction motor and the second traction motor are symmetric (e.g., having similar operational speed and torque ranges), application of the same motor input command may result in the same traction motor output (e.g., intensity and/or frequency of vibration) for each of the first traction motor and the second traction motor. In embodiments where the first traction motor and the second traction motor are asymmetric (e.g., having different speed and torque outputs), application of the same motor input command may result in different motor outputs for each traction motor. Different motor input commands may be applied to each traction motor to generate the same output among the traction motors, or to generate different outputs, as may be desired by a user or directed by a control system.

As described with respect to FIGS. 4 and 6, the motor input command may be generated based on frequency content of the audio signal or based on arbitrary and/or pre-determined frequency content. At 710, the method 700 may include applying fluctuating torque to the traction motor, wherein fluctuating torque represents frequency content of the audio signal. Operation 710 may be implemented when the motor input command is generated based on frequency content of the audio signal. At 712, the method 700 may include applying fluctuating torque to the traction motor, wherein fluctuating torque represents an arbitrary frequency signature. Operation 712 may be implemented when the motor input command is generated based on an arbitrary and/or pre-determined frequency content, where the audio signal is used as a trigger for generating the motor input command.

For vehicles with traction motors on the front and rear axles, persistent torque and fluctuating torque for a first traction motor and persistent torque and fluctuating torque for a second traction motor may be applied in opposite directions to create a resultant vertical vibrational force. This may result in vertical translation (e.g., vibration along the z-axis, with respect to axis system 520), as described with respect to the second distribution of motor torque 550 of FIG. 5A.

At 714, the method 700 includes adjusting vibration based on user input. For example, an intensity and/or frequency of vehicle vibration may be adjusted by a user, for example, through in-vehicle controls or out-of-vehicle controls (e.g., phone app, web, and so on). Adjusting vibration may include adjusting fluctuating torque applied to at least one of the traction motors.

Fluctuating torque may be applied as long as a motor input command is sent to motor(s). For example, a first motor input command may be received which corresponds to a first audio signal. Following receipt of the first motor input command, the controller may receive a second motor input command or may not receive an additional motor input command. The second motor input command may be based on a different audio signal (e.g., a change in pitch, intensity, frequency, and so on) of the audio signal output by the audio source. At 716, if the controller continues to receive the first motor input command or receives a second motor input command, the method 700 returns to operation 708 to apply fluctuating torque to the traction motors based on the motor input command and generate corresponding lower-frequency tactile energy (e.g., vibration). If it is determined at 716 that the controller does not receive a motor input command (e.g., the first motor input command is halted and a subsequent motor input command is not received) the method 700 ends and vibration of the vehicle halts.

In this way, a method for generating vibration of the vehicle system (e.g., lower-frequency tactile energy) may be provided synchronously with audio signal output into a cabin of the vehicle. Vibration may be provided for the vehicle system, as opposed to localized regions of the vehicle, such as a passenger seat. Additionally, vibration may be provided using existing vehicle and drivetrain elements, such that additional elements may not be added to the vehicle, conserving a weight, footprint, and cost of the vibration generating system. User experience may be enhanced when listening to music, watching a video, playing a video game, and engaging with other audio sources which are connected to the audio system and of the vehicle and selected to use the vibration generation method.

The technical effect of generating vibration based on audio signals using traction motors of a vehicle is providing lower-frequency tactile energy without addition of auxiliary elements to the drivetrain.

The disclosure also provides support for a method for creating tactile energy in a vehicle system, comprising: acquiring an audio signal from an audio source, responsive to acquiring the audio signal, generating a first motor input command for a first traction motor driving a wheel of the vehicle system. In a first example of the method, the audio signal is processed to generate the first motor input command for the first traction motor when a decibel level of the audio signal is greater than a decibel threshold. In a second example of the method, optionally including the first example, the first motor input command is generated using a frequency content of the audio signal by further processing the audio signal such that an amplitude of the first motor input command over time corresponds to the frequency content of the audio signal. In a third example of the method, optionally including one or both of the first and second examples, changes in the amplitude of the first motor input command over time generates fluctuating torque which corresponds to the frequency content of the audio signal. In a fourth example of the method, optionally including one or more or each of the first through third examples, the first motor input command is generated using an arbitrary and/or pre-determined frequency content by using the audio signal as a trigger to initiate generation of the first motor input command when a decibel level of the audio signal is greater than a decibel threshold, such that the first motor input command is comprised of a plurality of frequencies or a pre-determined frequency content. In a fifth example of the method, optionally including one or more or each of the first through fourth examples, fluctuating torque generated based on the first motor input command represents the arbitrary and/or pre-determined frequency content. In a sixth example of the method, optionally including one or more or each of the first through fifth examples, the first motor input command is generated responsive to acquiring the audio signal from a user selected audio source and the first motor input command is not generated responsive to acquiring the audio signal from an unselected audio source. In a seventh example of the method, optionally including one or more or each of the first through sixth examples, the method further comprises: applying the first motor input command to the first traction motor, and responsive to application of the first motor input command to the first traction motor, generating persistent torque and transferring persistent torque to a motor mount of the first traction motor, and generating fluctuating torque and transferring fluctuating torque to a drivetrain of the vehicle system to create a resultant vibrational force. In an eighth example of the method, optionally including one or more or each of the first through seventh examples, applying the first motor input command to the first traction motor is implemented when the vehicle system is in a park mode and the first motor input command is not applied to the first traction motor when a mu value drops below a mu threshold, and/or the vehicle system exits the park mode. In a ninth example of the method, optionally including one or more or each of the first through eighth examples, the method further comprises: generating a second motor input command according to the method used to generate the first motor input command, applying the second motor input command to a second traction motor, and responsive to application of the second motor input command to the second traction motor, generating fluctuating torque in a second direction that is opposite of a first direction of rotation of the first traction motor when the first traction motor is positioned on a first axle and the second traction motor is positioned on a second axle. In a tenth example of the method, optionally including one or more or each of the first through ninth examples, matching opposite torque is applied to each of the first traction motor and the second traction motor to generate a vertical translation of a sprung mass of the vehicle system when the vehicle system is configured with the first traction motor on a front axle and the second traction motor on a rear axle, different from the front axle. In an eleventh example of the method, optionally including one or more or each of the first through tenth examples, the method further comprises: generating a third motor input command and optionally generating a fourth motor input command according to the method used to generate the first motor input command, applying the third motor input command to a third traction motor and applying the fourth motor input command to a fourth traction motor, responsive to application of the third motor input command to the third traction motor, generating fluctuating torque in the first direction when the first traction motor and the third traction motor are positioned on the first axle, and, responsive to application of the fourth motor input command to the fourth traction motor, generating fluctuating torque in the second direction when the second traction motor and the fourth traction motor are positioned on the second axle.

The disclosure also provides support for a vehicle system, comprising: at least one traction motor, and a controller with computer readable instructions that when executed, while the vehicle system is a park mode, cause the controller to: acquire an audio signal from an audio source, generate at least one motor input command based on or in response to acquiring the audio signal, use each of the at least one motor input command to command generation of persistent torque and fluctuating torque by each of the at least one traction motors to generate vibration of the vehicle system. In a first example of the system, each traction motor of the at least one traction motors are coupled to a wheel of a set of wheels of the vehicle system. In a second example of the system, optionally including the first example in response to receiving a first motor input command, a first traction motor of the at least one traction motor positioned on a first axle of the vehicle system generates fluctuating torque in a first rotational direction and in response to receiving a second motor input command, a second traction motor of the at least one traction motor positioned on a second axle of the vehicle system generates fluctuating torque in a second rotational direction, opposite the first rotational direction.

The disclosure also provides support for a method for an electric vehicle traction motor, including: driving an input of a traction motor with audio signals in an electric vehicle to provide lower-frequency tactile energy. In a first example of the method, the input of the traction motor is generated by processing an audio signal with a low-pass filter and/or a band-pass filter. In a second example of the method, optionally including the first example, the method further comprises: driving the input of the traction motor when the electric vehicle is in a park mode. In a third example of the method, optionally including one or both of the first and second examples, the input of the traction motor commands application of persistent torque and fluctuating torque representative of a frequency content of audio signals to the traction motor. In a fourth example of the method, optionally including one or more or each of the first through third examples, the input of the traction motor commands application of persistent torque and fluctuating torque representative of an arbitrary frequency signature triggered by audio signals to the traction motor.

Note that the example control and estimation routines included herein can be used with various engine, electric motors, and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the vehicle control system, where the described actions are carried out by executing the instructions in a system including the various vehicle hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for creating tactile energy in a vehicle system, comprising:
    acquiring an audio signal from an audio source;
    responsive to acquiring the audio signal, generating a first motor input command for a first traction motor driving a wheel of the vehicle system, wherein the audio signal is processed to generate the first motor input command for the first traction motor when a decibel level of the audio signal is greater than a decibel threshold.

2. A method for creating tactile energy in a vehicle system, comprising:
    acquiring an audio signal from an audio source;
    responsive to acquiring the audio signal, generating a first motor input command for a first traction motor driving a wheel of the vehicle system, wherein the first motor input command is generated using a frequency content of the audio signal by further processing the audio signal such that an amplitude of the first motor input command over time corresponds to the frequency content of the audio signal.

3. The method of claim 2, wherein changes in the amplitude of the first motor input command over time generates fluctuating torque which corresponds to the frequency content of the audio signal.

4. A method for creating tactile energy in a vehicle system, comprising:
    acquiring an audio signal from an audio source;
    responsive to acquiring the audio signal, generating a first motor input command for a first traction motor driving a wheel of the vehicle system, wherein the first motor input command is generated using an arbitrary and/or pre-determined frequency content by using the audio signal as a trigger to initiate generation of the first motor input command when a decibel level of the audio signal is greater than a decibel threshold, such that the first motor input command is comprised of a plurality of frequencies or a pre-determined frequency content.

5. The method of claim 4, wherein fluctuating torque generated based on the first motor input command represents the arbitrary and/or pre-determined frequency content.

6. A method for creating tactile energy in a vehicle system, comprising:
    acquiring an audio signal from an audio source;
    responsive to acquiring the audio signal, generating a first motor input command for a first traction motor driving a wheel of the vehicle system, wherein the first motor input command is generated responsive to acquiring the audio signal from a user selected audio source and the first motor input command is not generated responsive to acquiring the audio signal from an unselected audio source.

7. The method of claim 1, further comprising:
    applying the first motor input command to the first traction motor; and
    responsive to application of the first motor input command to the first traction motor, generating persistent torque and transferring persistent torque to a motor mount of the first traction motor, and generating fluctuating torque and transferring fluctuating torque to a drivetrain of the vehicle system to create a resultant vibrational force.

8. The method of claim 7, wherein applying the first motor input command to the first traction motor is implemented when the vehicle system is in a park mode and the first motor input command is not applied to the first traction motor when a mu value drops below a mu threshold, and/or the vehicle system exits the park mode.

9. The method of claim 7, further comprising:
    generating a second motor input command according to the method used to generate the first motor input command;
    applying the second motor input command to a second traction motor; and responsive to application of the second motor input command to the second traction motor, generating fluctuating torque in a second direction that is opposite of a first direction of rotation of the first traction motor when the first traction motor is positioned on a first axle and the second traction motor is positioned on a second axle.

10. The method of claim 9, wherein matching opposite torque is applied to each of the first traction motor and the second traction motor to generate a vertical translation of a sprung mass of the vehicle system when the vehicle system is configured with the first traction motor on a front axle and the second traction motor on a rear axle, different from the front axle.

11. The method of claim 9, further comprising:
generating a third motor input command and optionally generating a fourth motor input command according to the method used to generate the first motor input command;
applying the third motor input command to a third traction motor and applying the fourth motor input command to a fourth traction motor;
responsive to application of the third motor input command to the third traction motor, generating fluctuating torque in the first direction when the first traction motor and the third traction motor are positioned on the first axle; and,
responsive to application of the fourth motor input command to the fourth traction motor, generating fluctuating torque in the second direction when the second traction motor and the fourth traction motor are positioned on the second axle.

12. A vehicle system, comprising:
at least one traction motor; and
a controller with computer readable instructions that when executed, while the vehicle system is a park mode, cause the controller to:
acquire an audio signal from an audio source;
generate at least one motor input command based on or in response to acquiring the audio signal;
use each of the at least one motor input command to command generation of persistent torque and fluctuating torque by each of the at least one traction motors to generate vibration of the vehicle system.

13. The vehicle system of claim 12, wherein each traction motor of the at least one traction motors are coupled to a wheel of a set of wheels of the vehicle system.

14. The vehicle system of claim 12, wherein, in response to receiving a first motor input command, a first traction motor of the at least one traction motor positioned on a first axle of the vehicle system generates fluctuating torque in a first rotational direction and in response to receiving a second motor input command, a second traction motor of the at least one traction motor positioned on a second axle of the vehicle system generates fluctuating torque in a second rotational direction, opposite the first rotational direction.

15. A method for an electric vehicle traction motor, including:
driving a motor input command of a traction motor with audio signals in an electric vehicle to provide lower-frequency tactile energy, wherein the input of the traction motor commands application of persistent torque and fluctuating torque representative of a frequency content of audio signals to the traction motor.

16. The method of claim 15, wherein the motor input command of the traction motor is generated by processing an audio signal with a low-pass filter and/or a band-pass filter.

17. The method of claim 15, further comprising driving the input of the traction motor when the electric vehicle is in a park mode.

* * * * *